Aug. 11, 1964 T. H. STEARNS 3,144,504

INTERCONNECTED FLEXIBLE ENCAPSULATED CONDUCTORS

Filed Sept. 30, 1960

Thomas H. Stearns
INVENTOR

Robert O. Richardson
ATTORNEY

United States Patent Office 3,144,504 Patented Aug. 11, 1964

3,144,504

INTERCONNECTED FLEXIBLE ENCAPSULATED CONDUCTORS

Thomas H. Stearns, Wilton, N.H., assignor to Sanders Associates, Inc., Nashua, N.H., a corporation of Delaware Filed Sept. 30, 1960, Ser. No. 59,615
4 Claims. (Cl. 174—68.5)

This invention relates to interconnected circuits and more particularly to circuits which overlap in position and which may be interconnected when desired.

In co-pending application, Serial No. 21,272, filed April 11, 1960, now Patent No. 2,997,521 and entitled "Insulated Electric Circuit Assembly," there is described a method of making circuits which involves laminating a sheet of cupric oxide coated copper on a base of thermoplastic material such as Kel-F, for example. Kel-F is a trademark of Minnesota Mining and Manufacturing Company, to identify their manufacturing of polymonochlorotrifluoroethylene. Suitable circuits are then etched on the foil with the unused copper removed. Thereafter, a suitable thermoplastic material is applied as a cover coat over the circuit and base. Co-pending application, Serial No. 60,638, filed October 5, 1960, relates to the method of exposing terminal portions of the encapsulated conductive circuit path such that external circuits may be electrically connected thereto. My co-pending application, Serial No. 57,936, filed September 23, 1960, now Patent No. 3,070,650, entitled, "Method and Article for Connecting Circuits" teaches how layers of these circuits may be electrically and mechanically bonded together wherein the electrical connection between selected conductive paths of the several strips are soldered under the heat and pressure of the mechanical lamination and bonding of the thermoplastic material of each strip. This provides a method of simultaneously connecting desired circuit paths together at the time of bonding the thermoplastic material of the strips together. This present invention relates to a method of laminating the thermoplastic strips together such that at a later time the conductive paths may be electrically connected as desired. This has particular application in a matrix for laboratory experimental design work where the conductive paths may be interconnected after the paths have been formed.

Heretofore, in accomplishing this function, the circuit portions to which connection might later be desired are bared. The exposed portions of the circuits are placed adjacent to each other in overlapping relationship, and the layers of thermoplastic strips which encapsulate them are then bonded under suitable heat and temperature. It has been found, however, that these bared portions are likely to come in contact during the lamination such that connection is made inadvertently, and that there is no way of entering the lamination to space the conductors apart again without injury to the encapsulating structure or the conductive paths.

In carrying out the concepts of the present invention to solve the foregoing problem, a vertical insulating spacer is placed between the planes of the circuit conductors with a thickness of a spacer selected in accordance with the minimum required voltage breakdown between the adjacent planes of conductors. The insulating spacer is preferably made of some thermo-setting material that does not flow at laminating temperatures and should be of such configuration as to permit the flow of a solder material to electrically and mechanically bond the conductors spaced therewith.

It is therefore an object of the present invention to provide for a method of connecting adjacent planes of circuit conductors, each of which is encapsulated in a thermoplastic material and bonded together in spaced relationship.

Another object is the provision of spaced overlapping circuits having their insulation bonded together and wherein the conductors lying in spaced adjacent planes may be later bonded together as desired.

Another object is the provision of an insulating spacer between planes of conductors to prevent electrical contact therebetween until connection is desired.

Other objects will become more apparent as the description of the preferred embodiment proceeds having reference to the drawings wherein.

Figure 1:
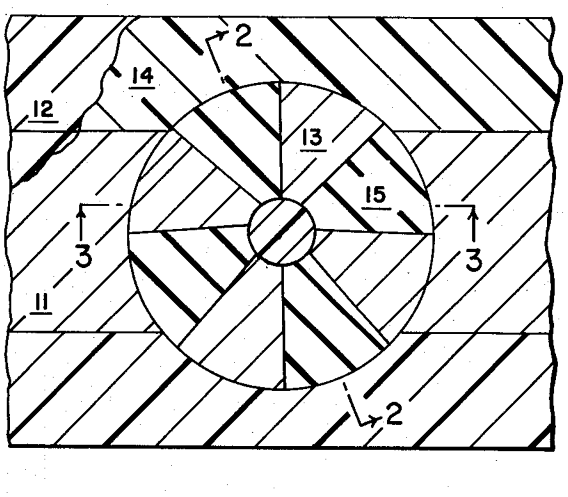
FIGURE 1 is a plan view of one circuit.

Referring now to FIGURE 1, there is shown a conductive strip 11 upon a thermoplastic base 12 and of a desired circuit configuration. Enlarged terminal portion 13 on conductor 11 has been exposed after a nearly transparent cover coat 14 has been applied to the base and conductor in a manner taught in co-pending application, Serial No. 21,272, filed April 11, 1960, now Patent No. 2,997,521. This exposure is done by removing that part of the cover coat 14 and is preferably done in the manner taught in co-pending application, Serial No. 60,638, filed October 5, 1960. On this exposed portion, a Maltese cross pattern 15 is silk screened onto the exposed portion of the conductor. This preferably is of liquid silicone rubber which vulcanizes itself at room temperature and has the characteristic of not flowing at the thermoplastic insulation laminating temperatures, thus retaining its shape similar to that of a thermo-setting material.

Figure 2:
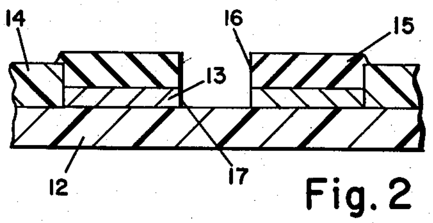
FIGURE 2 is a vertical sectional view taken along the line 2—2 of FIGURE 1.

As shown in the cross section in FIGURE 2, the arms of the Maltese cross may extend slightly beyond the enlarged conductor portion 13 if desired. The center portion 16 of the cross is left open to provide a fluid passage or clearance hole in the center for the flow of solder when interconnection is made. It should be noted that hole 17 had been etched in the terminal portion 13 to serve as a guide in matching the top strip, not shown in FIGURE 2, to the base strip for lamination. This hole may also serve as an opening in the event it is desired to solder the connections from the base side instead of from the top side.

Figures 3, 4:
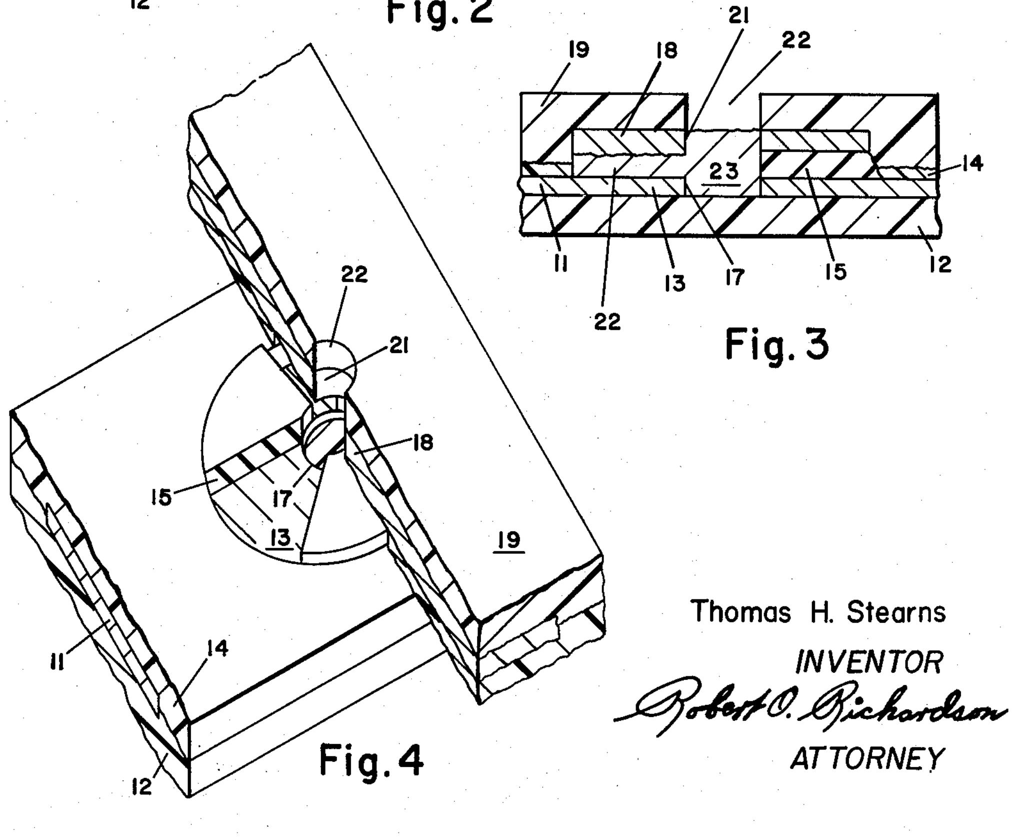
FIGURE 3 is a vertical sectional view taken along the line 3—3 of FIGURE 1, with a top conductor and its thermoplastic insulation laminated to the bottom strip.
FIGURE 4 is a perspective view of the lamination of the two strips with parts thereof broken away to better illustrate the interconnection therebetween.

As shown in FIGURE 3, a second thermoplastic encapsulated strip is joined to the first at right angles, although of course if desired, the strips may cross at any angle or they may run parallel with each other. A typical thickness of 5 mils will prevent arcing of a 500 volt potential. The first strip comprises the thermoplastic base 12 with its conductive path 11 and enlarged terminal portion 13 having the Maltese cross 15 of liquid silicone rubber silk screened thereover. A cover coat 14 of thermoplastic material has been bonded thereto in the manner described in co-pending application, Serial No. 21,272, filed April 11, 1960, now Patent No. 2,997,521. The second strip comprises a conductor with an exposed terminal portion 18 encapsulated in thermoplastic material 19 with the enlarged terminal portion 18 bared underneath and adapted to be positioned over terminal portion 13 of the first strip so that electrical and mechanical connection may be made between the two portions if desired. The center 21 of terminal 18 is also exposed in the etching process in the same manner as the hole 17 is formed in the terminal portion 13 of the first strip so that these openings may be easily matched in positioning the exposed portions prior to laminating. The silicone rubber Maltese cross 15 which is made up of a plurality of partial pie-shaped portions spaced from each other, maintains these terminals in spaced relationship, even after the thermoplastic material 19 of the second strip has been bonded to the upper coating 14 of the first strip. After the lamination of the two strips is complete and when it is desired to make the interconnection, a hole 22 is made in the thermoplastic material 19 of the second strip. A pre-tinned soldering iron is put through the holes previously provided in the terminals and in the Maltese cross insulating spacer. The solder from the soldering iron flows out through the channels between the terminals as provided by the arms of the cross to electrically connect the terminals as shown at 23.

The pictorial perspective view in FIGURE 4 more clearly illustrates the conception of the present invention. Here again is shown the first conductive strip 11 bonded to base 12 and encapsulated by covercoat 14. The strip has an enlarged terminal portion 13 upon which has been placed the Maltese cross pattern 15 of silicone rubber which has a clearance hole 16 in the center and a direct radial path from the center flow. Laminated to this first strip is a second strip consisting of a conductor which has been encapsulated in thermoplastic material 19. This conductor has a hole 21 in the center of its enlarged portion 18 and, as shown, a solder 23 has passed along the radial path of the Maltese cross to electrically and mechanically bond the two terminals together.

Having thus described the preferred embodiment, many modifications will become apparent to those skilled in the art. It is to be understood that this invention is not limited to the foregoing description and that these combinations and arrangement of parts as modified may be resorted to without departing from the spirit and scope of the invention as hereinafter claimed.

What is claimed is:

1. In combination a first flexible thermoplastic strip having at least one electrical conductor encapsulated therein, a second thermoplastic strip having at least one electrical conductor encapsulated therein, said strips being laminated together such that a terminal portion of a first conductor is in spaced overlapping relation with a terminal portion on the second conductor with the thermoplastic material removed from therebetween, an insulating spacer positioned between said overlapping terminal portions to maintain them in spaced relation, said terminal portions and said spacer having a central opening therethrough, said spacer having arms extending therefrom to define channels, said channels and said apertures being filled with an electrically and mechanically bonding material interconnecting said terminal portions.

2. In combination a first flexible thermoplastic strip having at least one electrical conductor encapsulated therein, a second thermoplastic strip having at least one electrical conductor encapsulated therein, said strips being laminated together in overlapping relation such that a terminal portion of a first conductor is in spaced relation with a terminal portion on the second conductor with the thermoplastic material removed from therebetween, an insulating spacer positioned between said overlapping terminal portions to maintain them in spaced relation, said spacer having a central opening therethrough and channels extending therefrom, said channels being filled with an electrically and mechanically bonding material interconnecting said terminal portions.

3. In combination a first flexible thermoplastic strip having at least one electrical conductor encapsulated therein, a second thermoplastic strip having at least one electrical conductor encapsulated therein, said strips being in overlapping relation such that a terminal portion of a first conductor is in spaced relation with a terminal portion on the second conductor with the thermoplastic material removed from therebetween, an insulating spacer positioned between said overlapping terminal portions to maintain them in spaced relation, said spacer having a central opening therethrough filled with an electrically and mechanically bonding material interconnecting said terminal portions.

4. In combination a first flexible thermoplastic strip having at least one electrical conductor encapsulated therein, a second thermoplastic strip having at least one electrical conductor encapsulated therein, said strips being laminated together in overlapping relations such that a terminal portion of a first conductor is in spaced relation with a terminal portion on the second conductor with the thermoplastic material removed from therebetween, an insulating spacer positioned between said overlapping terminal portions to maintain them in spaced relation, said terminal portions and said spacer having a central opening therethrough, said spacer having partial pie shaped portions spaced from each other to define channels therebetween of a Maltese cross configuration, said channels and said apertures being filled with an electrically and mechanically bonding material interconnecting said terminal portions.

References Cited in the file of this patent

UNITED STATES PATENTS

| | | |
|---|---|---|
| 2,889,532 | Slack | June 2, 1959 |
| 2,973,502 | Tally | Feb. 28, 1961 |
| 2,997,521 | Dahlgren | Aug. 22, 1961 |
| 3,070,650 | Stearns | Dec. 25, 1962 |

OTHER REFERENCES

Electronic Design, October 15, 1958, pages 24 and 25.

Klippel: IBM Technical Disclosure Bulletin, vol. 2, No. 4, December 1959.